Patented Oct. 9, 1934

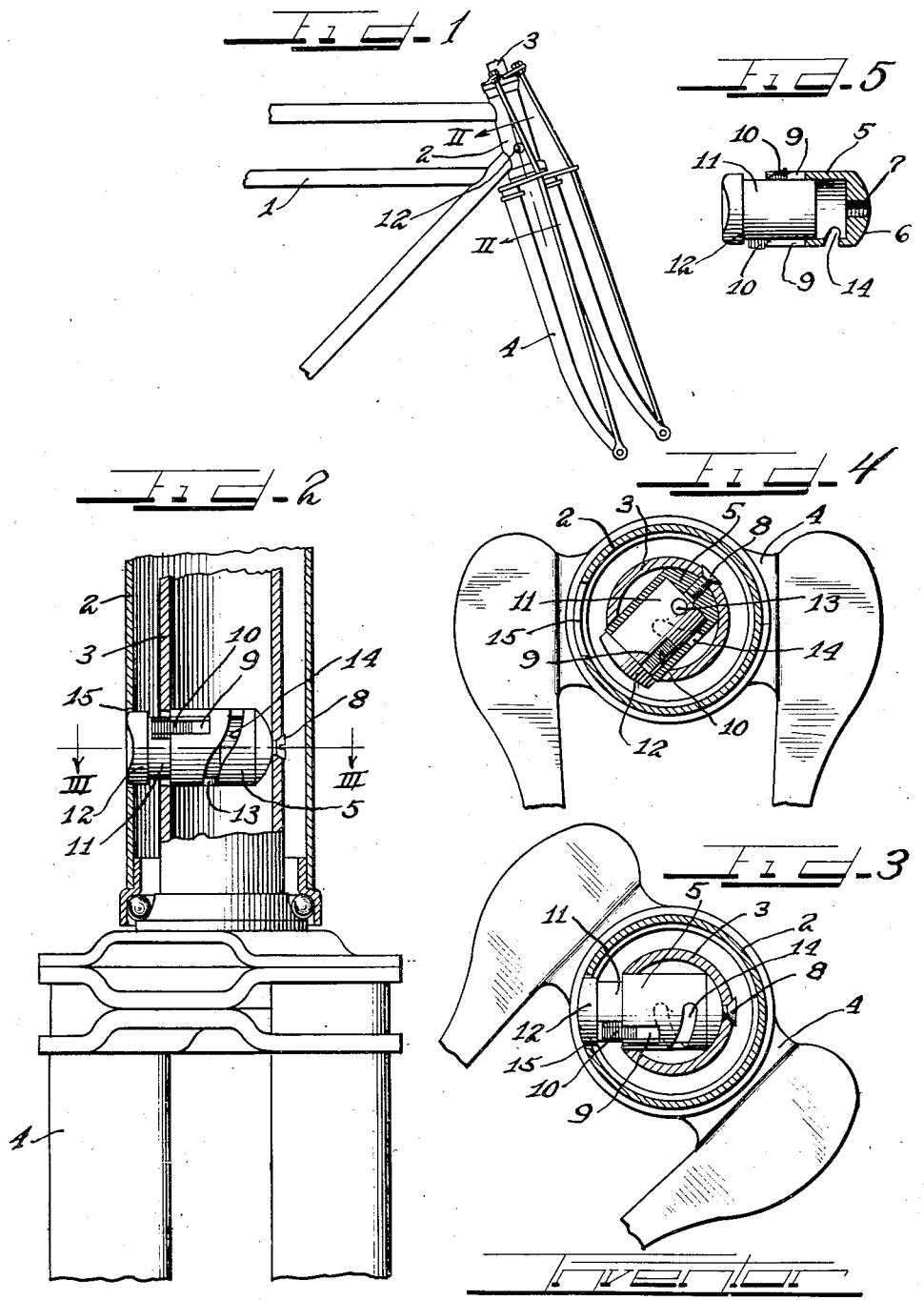

1,976,307

UNITED STATES PATENT OFFICE 1,976,307

LOCKING DEVICE

Oscar Taman, Chicago, Ill.

Application April 23, 1932, Serial No. 607,068
Renewed March 10, 1934

1 Claim. (Cl. 70—90)

This invention relates to an improved type of a locking device adapted for use in connection with two relatively movable members to hold one of said members locked against rotatable or slidable movement with respect to the other member, said locking device being applicable for use in the present instance in connection with a bicycle to permit the steering fork of the bicycle to be locked against rotation with respect to the steering post sleeve of the bicycle frame thereby acting to hold the front wheel of the bicycle at an angle or out of alignment with the bicycle frame thereby making it difficult for unauthorized persons to ride away on the bicycle in an attempt to steal the same.

It is an object of this invention to provide an improved and simplified type of lock for holding the steering fork of a bicycle or the like locked at an angle with respect to the bicycle frame.

It is also an object of this invention to provide an improved type of locking device in the form of a tumbler lock constructed so that when the same is unlocked by means of a key the barrel is projected outwardly out of the lock housing to serve as a lock bolt for holding two members locked against movement with respect to one another.

It is a further object of this invention to provide an improved and simplified form of locking device in the form of a tumbler lock having the housing thereof provided with a cam slot or spiral opening for receiving a pin secured to the lock barrel to cause the barrel to be projected outwardly out of the lock housing to serve as a latching bolt for locking a sleeve with respect to a shaft in which the lock housing is secured.

It is furthermore an object of this invention to provide an improved type of locking device in the form of a tumbler lock operable by means of a key and so constructed that the tumblers when released by insertion of the key permit the barrel to be projected out of the lock housing to serve as a locking bolt for projection into an opening in a stationary member engaged on the lock supporting member to hold the lock supporting member locked against movement.

It is an important object of this invention to provide a bicycle with a locking device for holding the steering fork of the bicycle locked at an angle with respect to the bicycle frame by means of an improved locking device mounted in the bicycle steering post and constructed so that when the lock is locked the barrel is in a retracted position permitting rotation of the steering fork, said locking device further adapted when unlocked by means of a key to have the barrel projected outwardly from the lock housing into a receiving opening provided in the steering post sleeve of the bicycle frame to hold the steering fork locked at an angle with respect to the bicycle frame to prevent the bicycle from being ridden in a straight course.

Other and further important objects of this invention will be apparent from the disclosures in the specification and the accompanying drawing.

The invention (in a preferred form) is illustrated in the drawing and hereinafter more fully described.

On the drawing:

Figure 1 is a fragmentary elevational view of the front frame portion of a bicycle equipped with an improved locking device embodying the principles of this invention and showing the bicycle steering fork locked against movement at an angle with respect to the bicycle frame.

Figure 2 is an enlarged fragmentary sectional view taken on line II—II of Figure 1 illustrating the locking device in elevation with the lock barrel projected into locking position with respect to the steering post sleeve of the bicycle frame.

Figure 3 is a fragmentary transverse detail section taken on line III—III of Figure 2.

Figure 4 is a fragmentary sectional view similar to that illustrated in Figure 3 but showing the lock barrel retracted to permit rotation of the bicycle steering post with respect to the steering post sleeve.

Figure 5 is a longitudinal sectional view of the locking device removed from the bicycle with the barrel section shown in elevation.

As shown on the drawing:

In the present showing of the improved locking device the same is illustrated and described in connection with a bicycle to permit the bicycle steering fork to be locked at an angle with respect to the bicycle frame.

The reference numeral 1 indicates a bicycle frame having a steering post sleeve 2 forming a part thereof. Rotatably mounted in the sleeve 2 is a steering post 3 on the upper end of which the bicycle handle bars are adapted to be mounted. Secured to the lower end of the steering post 3 is a steering or front fork 4 of the bicycle. For the purpose of locking the steering fork against rotation and at an angle with respect to the bicycle frame 1 the steering post 3 is provided with a diametrical opening for the mounting of the improved locking device embodying the principles of this invention. The locking device comprises a cylindrical housing or casing 5 closed at one end and open at the opposite end. The closed end of the housing 5 is rounded at 6 to seat against the inner curved surface of the hollow steering post 3 as illustrated in Figure 4. The closed end of the lock housing is also provided with a threaded opening 7 to removably receive a retaining screw 8 which projects through an opening in the steering post 3 opposite the opening in which the outer open end of the lock housing 5 is engaged. The lock housing 5 is provided with two diametrically opposite slots 9 for the reception of the tumblers 10. The tumblers 10 are mounted in a lock barrel 11 which is rotatably and slidably mounted in the open end of the lock housing 5. A latching head 12 of a diameter greater than the diameter of the barrel 11 is formed on the outer end of said barrel and is provided with a key slot for the reception of a key to permit retraction of the tumblers 10 when it is desired to operate the barrel 11.

Projecting radially from one side of the inner portion of the lock barrel 11 is a stud or pin 13 which projects into a cam groove or spiral slot 14 provided in the lock housing 5.

The improved locking device is mounted diametrically in the steering post 3 of the bicycle as clearly illustrated in Figure 4 and normally has the latching barrel 11 thereof in a retracted position so that the barrel head 12 is positioned in the space provided between the steering post 3 and the sleeve 2. It will be noted that in the retracted position of the latching barrel 11 that the steering fork 4 of the bicycle may be rotatably adjusted by means of the handle bars of the bicycle for the proper steering of the bicycle.

To prevent unauthorized persons from riding away on the bicycle the improved locking device is provided for the purpose of locking the steering fork 4 against rotatable movement at an angle with respect to the bicycle frame 1 so that a person getting on the bicycle could not ride away on the same but could merely ride around in a circle. The locking of the steering fork at an angle with respect to the bicycle frame would also make it extremely inconvenient for a person trying to steal the bicycle to roll the same away.

For the purpose of locking the steering fork at an angle with respect to the bicycle frame the steering post sleeve 2 is provided with an opening 15 in one side of the sleeve 2 so that the steering fork must be rotated into an angular position with respect to the bicycle frame 1 in order to bring the locking device in alignment with the opening 15 in the sleeve 2. With the locking device in alignment with the opening 15 the key for the tumbler lock is adapted to be projected through the opening 15 into the key slot provided in the head 12 of the barrel. Insertion of the key in the barrel 11 causes the tumblers 10 to be retracted from their projecting or locking position out of the housing slots 9 thereby permitting rotation of the barrel 11 by means of the key. With the tumblers retracted and with the key in the barrel the barrel is adapted to be rotated thereby causing the pin 13 to travel in the cam slot 14 causing the barrel 11 to move outwardly with respect to the lock housing 5 into the latching position illustrated in Figure 3 in which the head 12 of the barrel projects into the sleeve opening 15 to hold the steering post 3 locked against rotation with respect to the sleeve 2. With the barrel 11 projected into latching position and the head 12 serving as a latch member or locking bolt for preventing rotation or operation of the steering fork the key is removed from the barrel thereby permitting the tumblers to project outwardly into the housing slots 9 as illustrated in Figure 5 to hold the barrel 11 locked in its projected position with respect to the lock housing 5. Insertion of the key into the lock barrel retracts the plungers thereby permitting the barrel to be spirally rotated with respect to the lock housing 5 to move the barrel into either its retracted position to permit steering of the bicycle fork or into its projected locking position to engage in the opening 15 of the sleeve 2. The key may only be removed from the tumbler barrel 11 when the barrel is in its innermost or outermost positions to permit the lock tumblers to be projected into the slots 9 of the lock housing 5 with the removal of the key.

While the locking device has been described in combination with a bicycle steering post and the steering post sleeve to lock the steering post against relative rotational movement with respect to the sleeve 2 when the barrel 11 is in its projected latching position it will of course be understood that the locking device may be mounted in the inner member of two members which are slidably mounted with respect to one another with said outer member having an opening therein adapted when in a position to register with the head of the barrel to have the key inserted in the barrel to retract the tumblers and permit the barrel to be projected outwardly into the opening of the outer member to lock the same against slidable movement with respect to the inner member in which the locking device is supported.

It will of course be understood that various details of construction may be varied through a wide range without departing from the principles of this invention and it is therefore not the purpose to limit the patent granted hereon otherwise than necessitated by the scope of the appended claim.

I claim as my invention:

The combination with a bicycle steering post sleeve having an opening therein, of a steering post rotatably mounted in said sleeve, a lock housing positioned diametrically in said steering post, means for securing one end of said lock housing to the steering post, said lock housing having a spiral groove therein, a key operated lock barrel mounted to move longitudinally in said lock housing and having a head positioned to be moved into the opening in the steering post sleeve, and a pin on said lock barrel projecting into the spiral groove to cause the lock barrel to move outwardly with respect to the housing and project into the steering post sleeve opening to lock the steering post against rotation in the sleeve when a key is inserted into the barrel and is rotated.

OSCAR TAMAN.